US012300123B1

(12) United States Patent
Arjes-Maddox

(10) Patent No.: US 12,300,123 B1
(45) Date of Patent: May 13, 2025

(54) PILLAR DESIGNS

(71) Applicant: Raegan Arjes-Maddox, Cuba, MO (US)

(72) Inventor: Raegan Arjes-Maddox, Cuba, MO (US)

( * ) Notice: Subject to any disclaimer, the term of this patent is extended or adjusted under 35 U.S.C. 154(b) by 109 days.

(21) Appl. No.: 18/090,622

(22) Filed: Dec. 29, 2022

(51) Int. Cl.
*G09F 15/00* (2006.01)

(52) U.S. Cl.
CPC ................................ *G09F 15/0037* (2013.01)

(58) Field of Classification Search
CPC .. G09F 15/0037; E04F 13/0736; B42D 5/005; B42D 5/0065
USPC .................. 428/195.1, 542.2, 542.6; 52/105, 52/300–301, 831, 721.4, 723.1, 724.5; 281/2, 5, 10, 12, 13, 14; 283/56, 61, 62, 283/70, 72, 74, 81, 115
See application file for complete search history.

(56) References Cited

U.S. PATENT DOCUMENTS 850,735 A * 4/1907 Cummings et al. ..... B42D 3/02 283/64
1,149,713 A * 8/1915 Blogg .................... B65D 65/22 229/87.09
5,595,829 A * 1/1997 Pitts ........................ G09F 15/00 283/117
D380,229 S * 6/1997 Oren ................................ D19/1
5,746,031 A 5/1998 Burns
6,258,446 B1 * 7/2001 Russo ....................... G03F 1/90 428/411.1
6,363,644 B1 4/2002 Frost
D487,180 S * 2/2004 Lanzi ............................. D99/43
8,607,488 B2 * 12/2013 Johnston ............. G09F 15/0075 40/604
8,769,851 B2 * 7/2014 Picard ................. G09F 15/0037 40/606.12
2005/0244607 A1 * 11/2005 Irvin ................... E04H 12/2292 428/99
2007/0171644 A1 * 7/2007 Seibel ..................... F21V 21/10 362/249.01
2008/0176089 A1 * 7/2008 Lee ....................... B44C 5/0461 428/464
2009/0139441 A1 * 6/2009 Barone ................... G09F 17/00 116/173
2016/0016710 A1 * 1/2016 Merrill .................... B65B 67/08 229/87.01
2016/0237632 A1 * 8/2016 Mitchell ................. E04B 1/642
(Continued)

FOREIGN PATENT DOCUMENTS

DE 102008049127 A1 * 4/2010 ......... B65D 85/1072

*Primary Examiner* — Cassandra Davis
(74) *Attorney, Agent, or Firm* — Sanchelima & Associates, P.A.; Jesus Sanchelima; Christian Sanchelima

(57) ABSTRACT

A pillar designs including a decorative assembly and a cutting assembly. The decorative assembly includes a decoration member, wherein the decoration member is a sheet of paper with a customizable decoration theme that is adjusted in length to cover the circumference of a pillar. The cutting assembly includes grid lines and diameter marks, wherein the grid lines are vertical cutting lines that indicate where to cut as the user may consider appropriate. The diameter lines includes indicia of gradation marks that measures the length of the decoration member to indicate exactly the length to cut in order to cover the total circumference of the pillar.

1 Claim, 3 Drawing Sheets

(56) References Cited

U.S. PATENT DOCUMENTS

| | | | | |
|---|---|---|---|---|
| 2021/0339550 A1* | 11/2021 | Forrest | B42D 3/02 |
| 2021/0370707 A1* | 12/2021 | Hull | B44D 2/002 |

* cited by examiner

PILLAR DESIGNS

BACKGROUND OF THE INVENTION

1. Field of the Invention

The present invention relates to a pillar design and, more particularly, to a pillar design that includes a decorative kit for posts, poles, pillars or the like that include a decorative theme for any holiday.

2. Description of the Related Art

Several designs for pillar designs have been designed in the past. None of them, however, include a decorative member that is capable of being attached and detached from a pillar, wherein the decorative member is adjustable in length in order to match with the circumference of the pillar.

Applicant believes that a related reference corresponds to U.S. Pat. No. 6,363,644 issued for decorative pole cover. Applicant believes that another related reference corresponds to U.S. Pat. No. 5,746,031 issued for wild fire suppressor for utility poles. None of these references, however, teach of a decorating kit that may allow a user to decorate the posts on a porch to match current holidays. The kit may contain decorative themes for any holiday, birthdays, special events and the like.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a pillar decorating kit to enhance the look of homes during any holidays.

It is another object of this invention to provide a pillar kit that temporary covers existing porch pillars in festive decor.

It is still another object of the present invention to provide a customizable kit in height and diameter according to the existing porch pillars.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
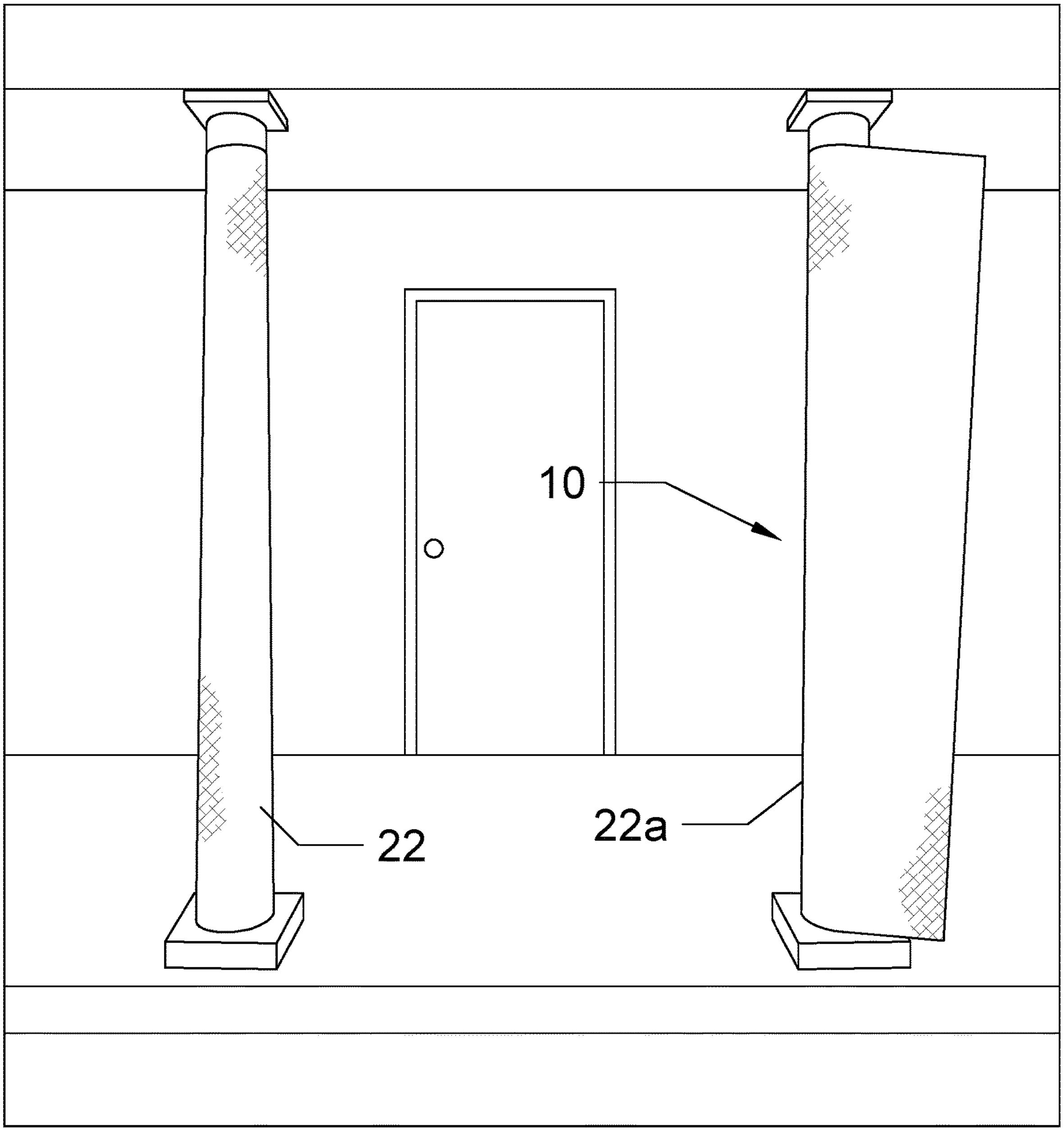
FIG. 1 represents an operational view of an exemplary embodiment of the present invention 10, wherein a plurality of decorative members 22*a* may be included in the kit.

Referring now to the drawings, where the present invention is generally referred to with numeral 10, it can be observed that it basically includes a decorative assembly 20 and a cutting assembly 40. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Figure 2:
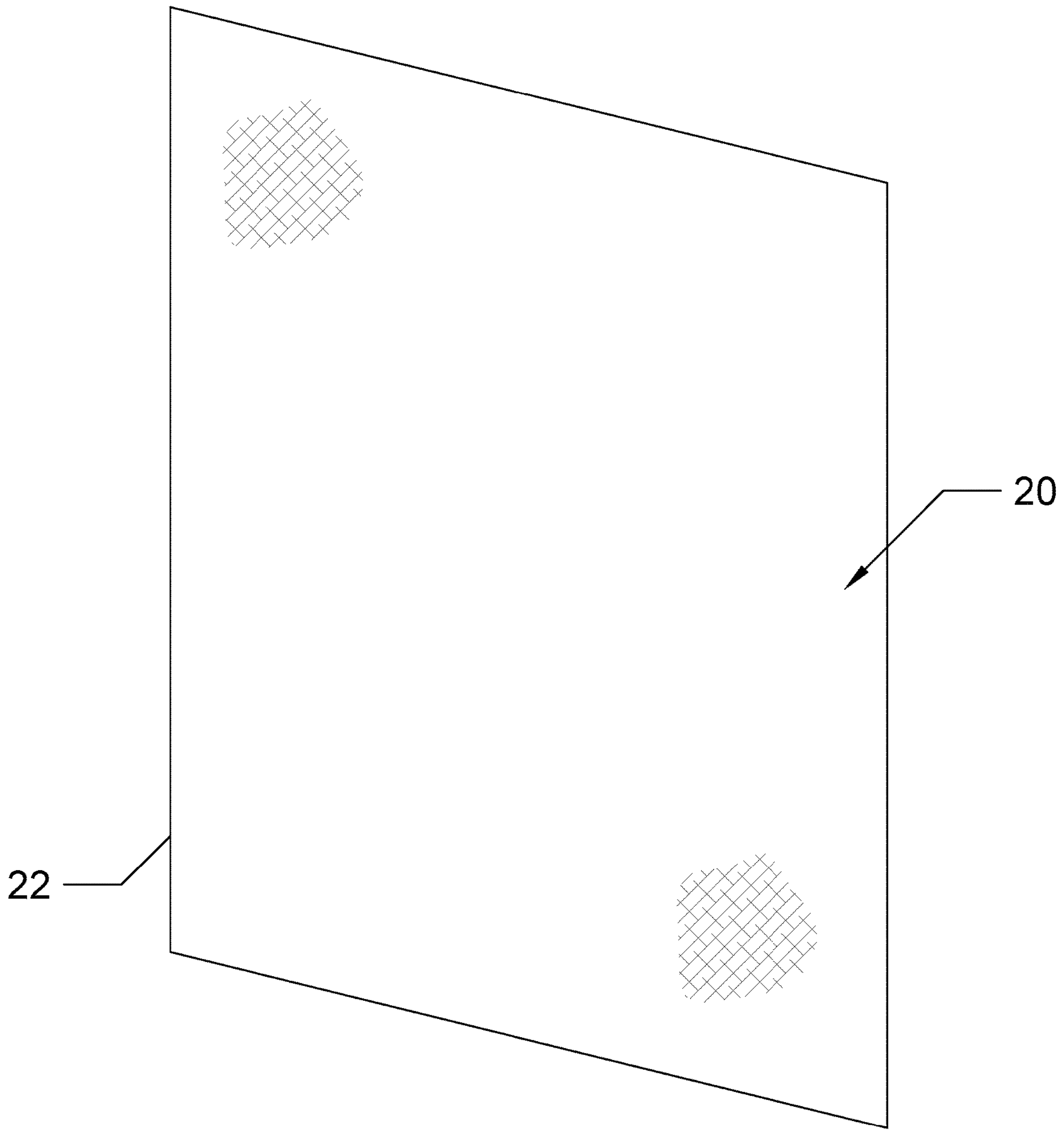
FIG. 2 shows an isometric view of the decorative assembly 20.

Decorative assembly 20 includes a decoration member 22. In an exemplary embodiment, the decorative member 22 may have a sheet of paper with a predetermined height and length to cover the circumference of a pillar, nonetheless it should be considered that the decoration member 22 may cover a pole, a post or any other cylindrical or tapered shape. FIG. 2 illustrates the shape of the decoration assembly 22 where it may have a rectangular shape, thereby the rectangular shape of the decoration member 22 may surround any cylindrical shape for decoration. Nevertheless, it should be considered that a cuboid shape, a tapered shape, or any other shape may be suitable to be covered by the decoration member 22. In a suitable embodiment, a front side of the decoration member 22 may have been stenciled, painted, printed or the like with a decorative theme for any holiday, birthday, special events and the like, wherein the decoration member 22 may be customizable as a user may consider appropriated. In a preferred embodiment, the decoration member 22 may be made of solid paper, paper backing with a vinyl coating, fabric backing with a vinyl coating, solid vinyl or any other suitable variation that allows the decoration member 22 to support the outdoor ambient.

Figure 4:
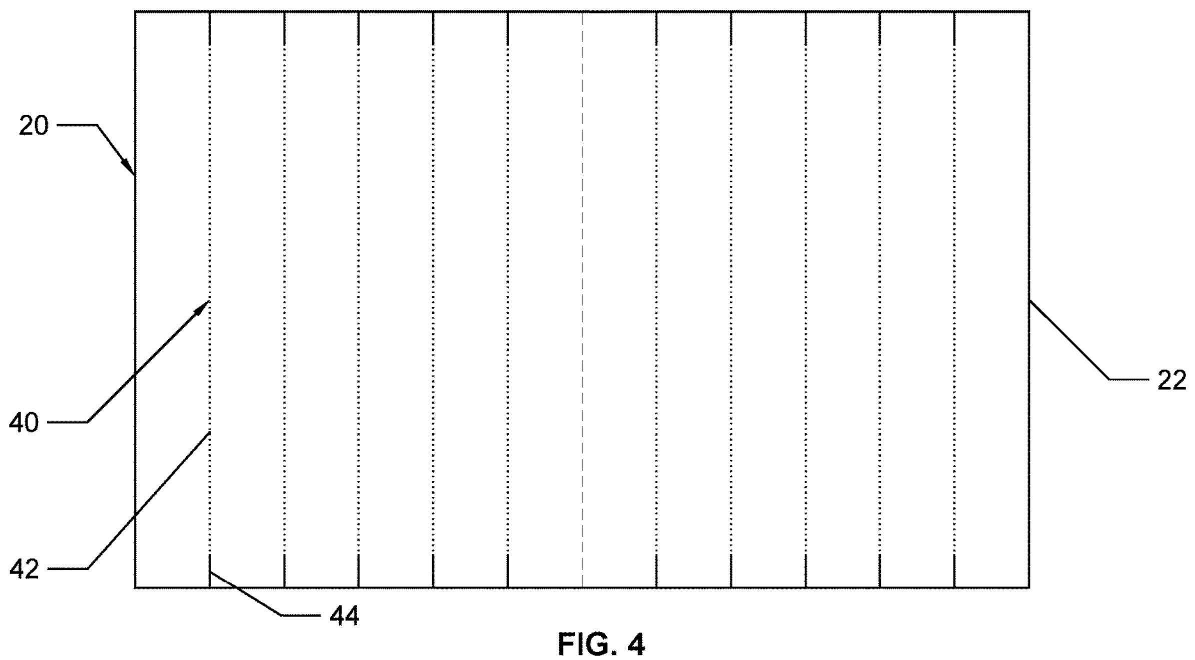
FIG. 4 is a representation of a rear view of the decoration member 22, wherein the grid lines illustrate a predetermined cutting section to match with the circumference of a pillar.

Cutting assembly 40 includes grid lines 42 and diameter marks 44. In an exemplary embodiment, the grid lines 42 may be vertical lines that divide the rear side of the decoration member 22 into rectangles. As best depicted in FIG. 4. In a suitable embodiment, the grid lines 42 may be cutting lines where the decoration member 22 may be cut, thereby the decoration member 22 may be adjusted in length according to the circumferences of the pillar by cutting the proper section by means of the grid lines 42. The grid lines 42 may include a center line to divide the shape of the decoration member 22 in symmetrical sections, thereby the user may know where the center of the decoration member 22 is to use it as a reference as a ruler, wherein the center line may be the starting point to measure the length of the decoration member towards a right section and a left section. As best illustrated in FIG. 4. In other embodiment, the diameter marks 44 are lines over a portion of the grid lines, where in the diameter marks 42 may help to indicate the length to be cut according to the diameter of the pillar to be covered. In one embodiment, the diameter marks 44 may include gradation marks to show the units of measurement, thereby the user may know which grid line of the grid lines 42 cut to cover the pillar circumference in its various diameter variations. As best illustrated in FIG. 1.

Figure 3:
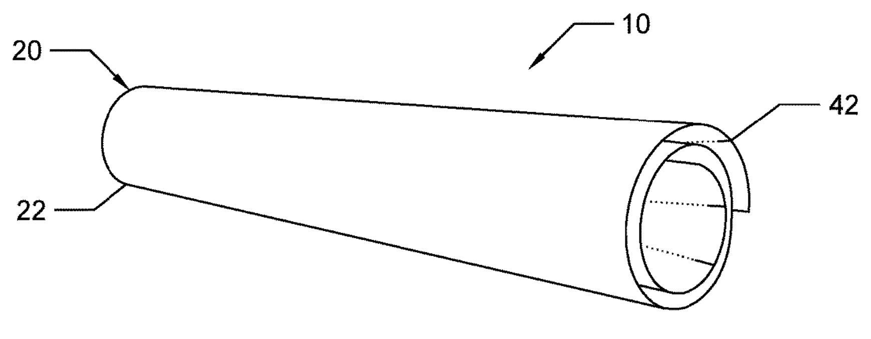
FIG. 3 illustrates an isometric view of the present invention 10 when rolled.

Referring to the figures of an exemplary embodiment of the present invention 10 and more particularly to FIG. 3, the decoration member may be made of a pliable material to be folded, rolled or the like, thereby the decoration member 22 may be stored or transported by decreasing the size thereof. It should be considered that the present invention 10 may include a decoration member 22 and a plurality of decoration members 22*a* to cover each pillar of a home porch. As FIG. 1 represents.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A pillar designs, consisting of:

a decorative assembly including a decoration member, wherein said decoration member has a rectangular shape with a customizable height and length, wherein the decoration member includes in a front side thereof a decorative theme, wherein said decorative theme is customizable according to a holiday, a celebration date, or a special event, said decoration member is made of a sheet paper that supports an outdoor ambiance, thereby a pillar is temporary decorated with said decorative theme, wherein said decorative theme is stenciled, painted, or printed; and a cutting assembly including grid lines and diameter marks, wherein said grid lines are vertical lines that divide a rear side said decoration member into smaller rectangular sections, said grid lines are cutting lines used as a reference to cut said rectangular sections, thereby said decoration assembly is adjusted to a circumference of said pillar, said diameter marks are lines over a portion of the grid lines to indicate the length of said decoration member, thereby the user knows exactly where to cut to cover a circumference of said pillar.

* * * * *